(12) United States Patent
Kaiser et al.

(10) Patent No.: US 12,353,991 B2
(45) Date of Patent: Jul. 8, 2025

(54) FAST DECODING IN SEQUENCE MODELS USING DISCRETE LATENT VARIABLES

(71) Applicant: GOOGLE LLC, Mountain View, CA (US)

(72) Inventors: Lukasz Mieczyslaw Kaiser, Mountain View, CA (US); Aurko Roy, San Francisco, CA (US); Ashish Teku Vaswani, San Francisco, CA (US); Niki Parmar, Sunnyvale, CA (US); Samuel Bengio, Los Altos, CA (US); Jakob D. Uszkoreit, Portola Valley, CA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 812 days.

(21) Appl. No.: 16/968,505

(22) PCT Filed: Feb. 11, 2019

(86) PCT No.: PCT/US2019/017534
§ 371 (c)(1),
(2) Date: Aug. 7, 2020

(87) PCT Pub. No.: WO2019/157462
PCT Pub. Date: Aug. 15, 2019

(65) Prior Publication Data
US 2020/0410344 A1 Dec. 31, 2020

Related U.S. Application Data

(60) Provisional application No. 62/628,912, filed on Feb. 9, 2018.

(51) Int. Cl.
*G06N 3/08* (2023.01)

(52) U.S. Cl.
CPC .................................... *G06N 3/08* (2013.01)

(58) Field of Classification Search
CPC ........... G06N 3/08; G06N 3/045; G06N 3/084
See application file for complete search history.

(56) References Cited

U.S. PATENT DOCUMENTS

2015/0356401 A1 12/2015 Vinyals et al.
2017/0230675 A1 8/2017 Pieter et al.
2019/0130249 A1* 5/2019 Bradbury ............... G06N 3/084

OTHER PUBLICATIONS

Zhou, L. et al., "Autoregressive Dynamic Latent Variable Models for Process Monitoring", https://ieeexplore.ieee.org/stamp/stamp.jsp?tp=&arnumber=7457350 (Year: 2017).*

(Continued)

*Primary Examiner* — Alexey Shmatov
*Assistant Examiner* — Devika S Maharaj
(74) *Attorney, Agent, or Firm* — Fish & Richardson P.C.

(57) ABSTRACT

Methods, systems, and apparatus, including computer programs encoded on a computer storage medium, for generating an output sequence from an input sequence. One of the methods includes receiving the input sequence; processing the input sequence using a latent prediction model configured to autoregressively predict a sequence of discrete latent variables that is shorter than the output sequence and that encodes the output sequence, wherein each discrete latent variable in the sequence is selected from a discrete set of latent variables; and processing the input sequence and the predicted sequence of discrete latent variables using a parallel decoder model configured to generate the outputs in the output sequence in parallel from the input sequence and the predicted sequence of discrete latent variables.

20 Claims, 4 Drawing Sheets

(56) References Cited

OTHER PUBLICATIONS

Lokare, V. et al., "Application of Deep Belief Networks for Image Compression", https://ijcsit.com/docs/Volume%206/vol6issue05/ijcsit20150605139.pdf (Year: 2015).*
Nallapati, R., "Abstractive Text Summarization using Sequence-to-sequence RNNs and Beyond", https://arxiv.org/abs/1602.06023 (Year: 2016).*
Tabacof, P. et al., "Adversarial Images for Variational Autoencoders", https://arxiv.org/abs/1612.00155 (Year: 2016).*
Hori, T. et al., "Efficient WFST-Based One-Pass Decoding With On-The-Fly Hypothesis Rescoring in Extremely Large Vocabulary Continuous Speech Recognition", https://ieeexplore.ieee.org/abstract/document/4156199 (Year: 2007).*
Abadi et al., "Tensorflow: Large-scale machine learning on heterogeneous distributed systems", arXiv:1603.04467v2, Mar. 2016, 19 pages.
Ba et al., "Layer normalization", arXiv:1607.06450v1, Jul. 2016, 14 pages.
Bahdanau et al., "Neural machine translation by jointly learning to align and translate", arXiv:1409.0473v7, May 2016, 15 pages.
Bowman et al., "Generating sentences from a continuous space", arXiv:1511.06349v4, May 2016, 12 pages.
Burda et al., "Importance weighted autoencoders", arXiv:1509.00519v4, Nov. 2016, 14 pages.
Cho et al., "Learning phrase representations using RNN encoder-decoder for statistical machine translation", arXiv:1406.1078v3, 15 pages.
Gehring et al., "Convolutional sequence to sequence learning", arXiv:1705.03122v3, Jul. 2017, 15 pages.
Glorot et al., "Understanding the difficulty of training deep feedforward neural networks" Proceedings of the Thirteenth International Conference on Artificial Intelligence and Statistics, 2019, 8 pages.
Grathwohl et al., "Backpropagation through the void: Optimizing control variates for black-box gradient estimation" arXiv, 2017, 16 pages.
Gu et al., "Non-autoregressive neural machine translation", arXiv:1711.02281v2, Mar. 2018, 13 pages.
Hinton et al., "Reducing the dimensionality of data with neural networks", Science, 2006, 313(5786):504-507.
Hochreiter et al., "Long short-term memory", Neural Computation, 1997, 9(8):1735-1780.
Huang et al., "Multiple Codebook Semi-Continuous Hidden Markov Models for Speaker-Independent Continuous Speech Recognition", Carnegie-Mellon University, Dept. Comp. Science., 1989, 23 pages.
Huang et al., "Unified techniques for vector quantisation and hidden markov modeling using semi-continuous models", International Conference on Acoustics, Speech, and Signal Processing, 1989, pp. 639-642.
Jang et al., "Categorical Reparameterization with Gumbel-Softmax", arXiv:1611.01144v5, Aug. 2017, 13 pages.
Jegou et al., "Product quantization for nearest neighbor search" IEEE Transactions on Pattern Analysis and Machine Intelligence, 2011, 14 pages.
Kaiser et al., "Can active memory replace memory", Advances in Neural Information Processing Systems, 2016, 9 pages.
Kaiser et al., "Depthwise Separable Convolutions for Neural Machine Translation", arXiv:1706.03059v2, Jun. 2017, 10 pages.
Kaiser et al., "Discrete autoencoders for Sequence Models", arXiv:1801.09797v1, Jan. 2018, 10 pages.
Kaiser et al., "Neural GPUs Learn Algorithms" arXiv:1511.08228v3, Mar. 2016, 9 pages.
Kalchbrenner et al., "Neural Machine Translation in Linear Time", arXiv:1610.10099v2, Mar. 2017, 9 pages.
Kalchbrenner et al., "Recurrent Continuous Translation Models", Proceedings of the 2013 Conference on Empirical Methods in Natural Language Processing, 2013, pp. 1700-1709.
Kingma et al., "Auto-encoding Variational Bayes", arXiv:1312.6114v10, May 2014, 14 pages.
Lam, "Word2Bits—quantized word vectors" arXiv, 2018, 9 pages.
Lee et al., "The Sphinx Speech Recognition Systems", Acoustics, Speech and Signal Processing, 1989, pp. 445-448.
Liu et al., "Generating Wikipedia by summarizing long sequences", arXiv:1801.10198v1, Jan. 2018, 18 pages.
Maddison et al., "The concrete distribution: A continuous relaxation of discrete random variables", arXiv:1611.00712v3, Mar. 2017, 20 pages.
Meng et al., "Encoding source language with convolutional neural network for machine translation", arXiv:1503.01838v5, Jun. 2015, 12 pages.
Mnih et al., "Neural variational inference and learning in belief networks", arXiv:1402.0030v2, Jun. 2014, 10 pages.
Mnih et al., "Variational inference for monte carlo objectives", arXiv:1602.06725v2, Jun. 2016, 12 pages.
Nallapati et al., "Abstractive Text Summarization using Sequence-to-sequence RNNs and Beyond" Proceedings of the 20th SIGNLL Conference on Computational Natural Language Learning, 2016, 11 pages.
Norouzi et al., "Cartesian k-means" Computer Vision and Pattern Recognition, 2013, 8 pages.
PCT International Preliminary Report on Patentability in International Application No. PCT/US2019/017534, dated Aug. 11, 2020, 13 pages.
PCT International Search Report and Written Opinion in International Appln. No. PCT/US2019/017534, dated May 27, 2019, 20 pages.
Peinado et al., "Discriminative codebook design using multiple vector quantization in HMM-Based speech recognizers", IEEE Transactions on Speech and Audio Processing, 1996, 4(2):89-95.
Rezende et al., "Stochastic backpropagation and approximate inference in deep generative models", arXiv:1401.4082v3, May 2014, 14 pages.
Rogina et al., "Learning state-dependent stream weights for multi-codebook HMM speech recognition systems", IEEE International Conference on Acoustics, Speech and Signal Processing, 1994, pp. I-217-I-220.
Salakhutdinov et al., "Deep Boltzmann Machines", Artificial Intelligence and Statistics, 2009, pp. 448-455.
Salakhutdinov et al., "Semantic hashing", International Journal of Approximate Reasoning, 2009, 50:969-978.
Shu et al., "Compressing word embeddings via deep compositional code learning" International Conference on Learning Representations, 2018, 13 pages.
Subakan et al., "Learning the base distribution in implicit generative models" arXiv, 2018, 16 pages.
Sutskever et al., "Sequence to sequence learning with neural networks", Advances in Neural Information Processing Systems, 2014, pp. 3104-3112.
Tucker et al., "Rebar: Low-variance, unbiased gradient estimates for discrete latent variable models" NIPS, 2017, 10 pages.
Van den Oord et al., "Neural discrete representation learning" arXiv, 2017, 10 pages.
Van den Oord et al., "Wavenet: A generative model for raw audio" arXiv, 2016, 15 pages.
Van den Oord et al., "Neural discrete representation learning", Advances in Neural Information Processing Systems, 2017, pp. 6306-6315.
Van den Oord et al., "WaveNet: A generative model for raw audio", arXiv:1609.03499v2, Sep. 2016, 15 pages.
Vaswani et al., "Attention is all you need", Advances in Neural Information Processing Systems, 2017, pp. 5998-6008.
Vaswani et al., "Image Transformer", arXiv:1802.05751v3, Jun. 2018, 10 pages.
Vincent et al., "Stacked Denoising Autoencoders: Learning useful representations in a deep network with a local denoising criterion", Journal of Machine Learning Research, 2010, 11:3371-3408.
Vinyals et al., "Grammar as a Foreign Language", Advances in Neural Information Processing Systems, 2015, 9 pages.
Williams, "Simple statistical gradient-following algorithms for connectionist reinforcement learning", Machine Learning, 1992, 8:229-256.

(56) References Cited

OTHER PUBLICATIONS

Yang et al., "Improved variational autoencoders for text modeling using dilated convolutions", arXiv:1702.08139v2, Jun. 2017, 12 pages.
EP Office Action in European Application No. 19707567.4, dated Aug. 6, 2021. 12 pages.
Office Action in European Appln. No. 19707567.4, dated Apr. 5, 2023, 9 pages.
Office Action in Chinese Appln. No. 201980012517.3, dated Mar. 31, 2023, 22 pages (with English Translation).
Bahdanau et al., "End-to-end attention based large vocabulary speech recognition," CoRR, Submitted on Aug. 18, 2015, arXiv:1508.04395v1, 8 pages.
Bahdanau et al., "Neural Machine Translation by Jointly Learning to Align and Translate," CoRR, Submitted on Dec. 19, 2014, arXiv:1409.0473v4, 15 pages.
Li et al., "A Hierarchical Neural Autoencoder for Paragraphs and Documents," CoRR, Submitted on Jun. 6, 2015, arXiv:1506.01057v2, 10 pages.
Lukasz et al., "Fast Decoding in Sequence Models Using Discrete Latent Variables," CoRR, Submitted on Jun. 7, 2018, arXiv:1803.03382v6, 10 pages.
Mikolov et al., "Distributed Representations of Words and Phrases and their Compositionality," CoRR, Submitted on Oct. 16, 2013, arXiv:1310.4546v1, 9 pages.
Office Action in European Appln. No. 19707567.4, mailed on Sep. 18, 2024, 14 pages.
Venugopalan et al., "Sequence to sequence—video to text," CoRR, Submitted on Oct. 19, 2015, arXiv:1505.00487, 9 pages.

\* cited by examiner

FAST DECODING IN SEQUENCE MODELS USING DISCRETE LATENT VARIABLES

BACKGROUND

This specification relates to generating output sequences from input sequences using neural networks.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

Some systems use auto-regressive sequence models based on deep neural networks to perform a sequence processing task.

Neural networks are machine learning models that employ one or more layers of nonlinear units to predict an output for a received input. Deep neural networks include multiple hidden layers in addition to an input layer and an output layer. The output of each hidden layer is generally used as input to a next layer in the network, i.e., the next hidden layer or the output layer. Each layer of the network generates an output from a received input in accordance with current values of a respective set of parameters.

Some deep neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

Another type of deep neural network architecture is deep convolutional neural network, of which Wavenet is an example. In particular, convolutional neural networks having a Wavenet architecture auto-regressively generate outputs by repeatedly adding a new output to the output sequence by processing the already-generated output sequence through multiple blocks of masked convolutional layers.

A different type of deep neural network architecture is the Transformer architecture. The Transformer architecture includes an encoder neural network that repeatedly applies self-attention over the input sequence to generate encoded representations of the inputs in the input sequence and a decoder neural network that autoregressively generates the output sequence by applying attention over the encoded representations of the input sequence and masked self-attention over the already-generated output sequence.

SUMMARY

This specification describes a system implemented as computer programs on one or more computers in one or more locations that generates an output sequence that includes a respective output at each of multiple positions in an output order from an input sequence that includes a respective input at each of multiple positions in an input order, i.e., transduces the input sequence into the output sequence.

Particular embodiments of the subject matter described in this specification can be implemented so as to realize one or more of the following advantages.

Auto-regressive models, e.g., Wavenet models or Transformers models, have been shown to achieve high-quality performance on a variety of output generation tasks, e.g., speech recognition, machine translation, image generation, and so on. However, auto-regressive models require a new output to be added to the end of the current output sequence at each of multiple time steps, with the new output being conditioned on the current output sequence. Generating outputs sequentially in this manner results in long inference times and significant computational resource consumption, particularly when output sequences being generated are long. The described techniques, on the other hand, only generate a shorter (for example, four or eight times shorter) sequence of latent variables auto-regressively and then generate the output sequence in parallel from the sequence of latent variables. Therefore, decoding time (i.e., the time required to generate an output sequence) and resource consumption are drastically reduced relative to conventional auto-regressive models. Moreover, the quality of the generated output sequence remains high. Thus, the described techniques allow for generation of a high quality output sequence in less time and while consuming fewer computational resources than conventional approaches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
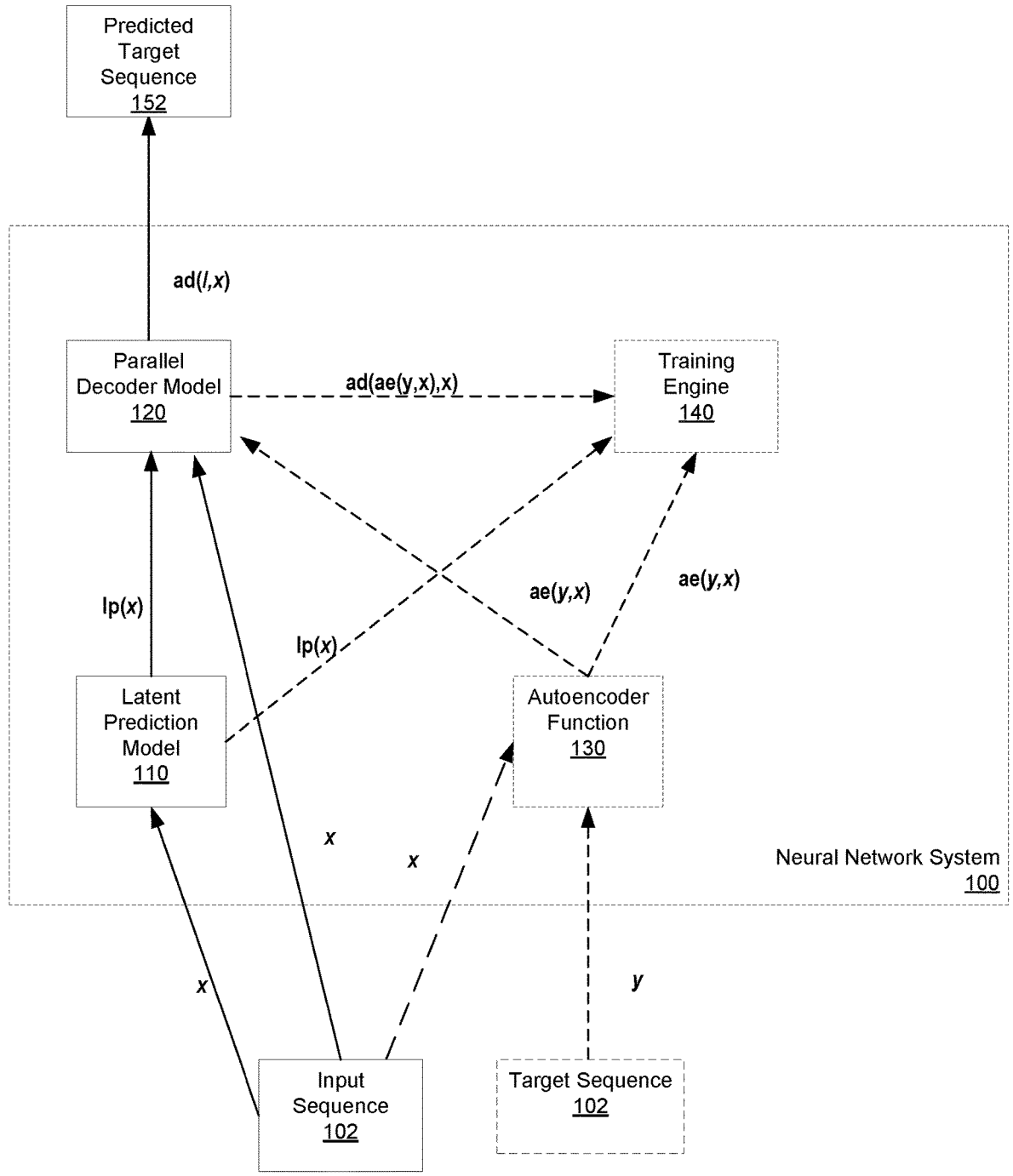
FIG. 1 shows an example neural network system.

This specification describes a system implemented as computer programs on one or more computers in one or more locations that generates a predicted target sequence that includes a respective output at each of multiple positions in an output order from an input sequence that includes a respective input at each of multiple positions in an input order, i.e., transduces the input sequence into the predicted target sequence.

For example, the system may be a neural machine translation system. That is, if the input sequence is a sequence of words in an original language, e.g., a sentence or phrase, the target sequence may be a translation of the input sequence into a target language, i.e., a sequence of words in the target language that represents the sequence of words in the original language.

As another example, the system may be a speech recognition system. That is, if the input sequence is a sequence of audio data representing a spoken utterance, the target sequence may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the target sequence may be a summary of the input sequence in the original language, i.e., a sequence that has fewer words than the input sequence but that retains the essential meaning of the input sequence. As another example, if the input sequence is a sequence of words that form a question, the target sequence can be a sequence of words that form an answer to the question.

As another example, the system may be part of a computer-assisted medical diagnosis system. For example, the input sequence can be a sequence of data from an electronic medical record and the target sequence can be a sequence of predicted treatments.

As another example, the system may be part of an image processing system. For example, the input sequence can be an image, i.e., a sequence of color values from the image, and the output can be a sequence of text that describes the image. As another example, the input sequence can be a sequence of text or a different context and the output sequence can be an image that describes the context.

As another example, the system may be an image generation system that generates images conditioned on a particular type of input, e.g., a smaller image, an object category, or a natural language text sequence. In these examples, the system may receive a representation of the image as a sequence and then generate the output image as a sequence of color values, i.e., of color channel values for the pixels of the output image, or as a two-dimensional structure of color values.

As another example, the system may be part of an extractive summarization system. In particular, the input sequence can be text from multiple input documents and, optionally, a topic of the documents, and the output sequence can be a text summary of the input documents.

FIG. 1 shows an example neural network system 100. The neural network system 100 is an example of a system implemented as computer programs on one or more computers in one or more locations, in which the systems, components, and techniques described below can be implemented.

The neural network system 100 receives an input sequence 102 and processes the input sequence 102 to transduce the input sequence 102 into an output sequence 152, i.e., a predicted target sequence for the input sequence 102.

The input sequence 102 has a respective input token at each of multiple input positions in an input order and the output sequence 152 has a respective output token at each of multiple output positions in an output order. That is, the input sequence 102 has multiple inputs arranged according to an input order and the output sequence 152 has multiple outputs arranged according to an output order.

As described above, the neural network system 100 can perform any of a variety of tasks that require processing sequential inputs to generate sequential outputs.

The neural network system 100 includes a latent prediction model 110 and a parallel decoder model 120.

The latent prediction model 110 is configured to receive the input sequence and to process the input sequence to predict a sequence of discrete latent variables that encodes a target sequence for the input sequence, i.e., to predict a sequence of discrete latent variables that encodes the output sequence that should be generated by the system 100 for the input sequence. In other words, the latent prediction model 110 processes the input sequence x to generate a predicted sequence lp(x) that is a prediction of a sequence of discrete latent variables that would encode the target sequence.

The sequence of latent variables is referred to as a sequence of discrete latent variables because each latent variable in the sequence is discrete, i.e., selected from a discrete set of possible latent variables that has a fixed number of latent variables, rather than continuous.

As will be described in more detail below, the latent prediction model 110 has been trained to generate predicted sequences that match sequences that would be generated by an autoencoder function 130 that has access to the known target output sequence for the input sequence. As part of generating the sequence, the autoencoder function 130 selects each latent variable from a discrete set of latent variables.

The latent prediction model 110 is configured to autoregressively predict the latent variables in the predicted sequence. That is, the latent prediction model 110 generates each latent variable in the sequence one after the other, i.e., with each latent variable being conditioned on the latent variables in the sequence that have already been generated. In particular, the latent prediction model 110 can be a model that is based on multiple self-attention layers, e.g., a model that has the Transformer architecture.

Although the latent prediction model 110 autoregressively generates the sequence, the sequence of latent variables is shorter than the output sequence that will be generated. For example, the sequence of latent variables can include m latent variables while the output sequence can include n outputs, with m being less than n. For example, m can be ⅛, ¼, or ½ of n. Because the sequence of latent variables is shorter, the latent prediction model 110 can generate the sequence of latent variables significantly faster than a conventional autoregressive model could generate the output sequence.

The parallel decoder model 120 generates the output sequence 152 from the predicted sequence of latent variables and the input sequence 102. In particular, the parallel decoder model is a parallel model that generates the predicted target sequence ad(l,x) from the predicted sequence of latent variables lp(x) and the input sequence x. Because the parallel decoder model 120 is a parallel model, the parallel decoder model 120 generates all of the outputs in the predicted target sequence in one pass and independently of one another. Thus, the parallel decoder model 120 can extend the predicted latent sequence to a sequence that includes n outputs in minimal time and the generation of the predicted latent sequence does not significantly impact the latency of the generation of the predicted target sequence.

The parallel decoder model 120 can be implemented as a deep neural network that includes multiple steps of layers that each double the length of the input sequence to the step. Once the steps of layers have generated a sequence that is the same length as the predicted target sequence, the same length sequence can be processed by a self-attention decoder that has a Transformer architecture to generate the output sequence 152.

Each of the multiple steps of layers can include a residual block of convolutional layers that receives an input sequence for the step and generates an alternative input sequence that has the same length as the input sequence for the step. Each step can also include an encoder-decoder attention layer with dot product attention that attends over the input sequence x at each position in the alternative input sequence. Optionally, this encoder-decoder attention layer can be followed by a residual connection. The output of the encoder-decoder attention layer (or the output of the residual connection) can be processed by an up-convolution that doubles the internal dimension of the sequence and then a reshape operation that reshapes the sequence to have twice the length of the input to the step of layers. The parallel decoder model 120 repeatedly doubles the length of the predicted latent variable sequence until the model has generated a sequence that is the same length as the output sequence using the multiple steps of layers.

Thus, the parallel decoder model 120 generates the output sequence in parallel conditioned on the predicted latent variable sequence and the input sequence.

As compared to conventional auto-regressive models, instead of directly auto-regressively generating the entire output sequence, the described system only auto-regressively generates a shorter sequence of discrete variables and then, in parallel, generates the output sequence from the discrete latent variable sequence.

In order to configure the latent prediction model 110 and the parallel decoder model 120 to generate accurate output sequences, a training engine 140 trains the models 110 and 120 to determine trained values of the parameters of the models 110 and 120. In particular, the training engine 140 trains the latent prediction model 110 and the parallel decoder model 120 jointly with an autoencoder function 130 on training data that includes multiple input-output pairs. Each pair includes an input sequence and a known target sequence that should be generated for the input sequence. Thus, at training time, the system 100 has access to a known target sequence 104 for the input sequence 102.

The autoencoder function 130 is configured to process the known target sequence 104 and the input sequence 102 to generate a sequence of discrete latent variables that encodes the target sequence 104, i.e., a sequence of discrete latent variables from which the target sequence 102 can be accurately reconstructed.

In particular, the autoencoder function 130 can be implemented as a deep neural network that includes multiple convolutional layers and one or more attention layers that attend to the input sequence x as described above. For example, the autoencoder function 130 can be implemented as a stack of residual convolutions, i.e., as a residual block of convolutional layers, followed by an attention layer attending to x and a stack of strided convolutions. Thus, these layers generate an initial encoder output that includes m initial encoder outputs.

The autoencoder function 130 also includes a discretization bottleneck that maps each of the initial encoder outputs to a discrete latent variable from a set of discrete latent variables to generate the sequence of discrete latent variables. The latent variables in the set of discrete latent variables also adjusted by the training engine 140 during the training.

The autoencoder function 130 can use any of a variety of discretization bottlenecks to perform the mapping.

One example of a discretization bottleneck is the Gumbel-Softmax discretization function. Such a bottleneck and ways to adjust the latent variables during training when this bottleneck is employed are described in Jang, Eric, Gu, Shixiang, and Poole, Ben. Categorical reparameterization with gumbel-softmax. CoRR, abs/1611.01144, 2016. URL http://arxiv.org/abs/1611.01144.

Another example of a discretization bottleneck is the Improved Semantic Hashing bottleneck. Such a bottleneck and ways to adjust the latent variables during training when this bottleneck is employed are described in Kaiser, Lukasz and Bengio, Samy. Discrete autoencoders for sequence models. CoRR, abs/1801.09797, 2018. URL http://arxiv.org/abs/1801.09797.

Another example of a discretization bottleneck is the Vector Quantized-Variational Autoencoder (VQ-VAE) bottleneck. A VQ-VAE bottleneck maintains a set of latent variables, and for each initial encoder output, selects the closest latent variable in the set as the discrete latent variable corresponding to the initial encoder output. Such a bottleneck and ways to adjust the latent variables during training when this bottleneck is employed are described in van den Oord, Aaron, Vinyals, Oriol, and Kavukcuoglu, Koray. Neural discrete representation learning. CoRR, abs/1711.00937, 2017. URL http://arxiv.org/abs/1711.00937.

While any of these bottlenecks may be employed, some of these approaches may not perform as well when the set of discrete latent variables K is large.

To account for this, the autoencoder may employ either Projected Vector Quantization (DVQ) bottleneck or a Sliced Vector Quantization (SVQ) bottleneck.

In SVQ, the discretization bottleneck divides each initial encoder output into nd smaller slices. The discretization bottleneck maintains a separate subset of discrete latent variables slices for each of the slices and selects, for each slice, the discrete latent variable slice from the corresponding subset that is closest to the slice. The system then generates the discrete latent variable corresponding to the encoder output as a concatenation of the selected latent variable slices. The latent variable slices are updated during training in the same manner as the latent variables in the VQ-VAE bottleneck.

In PVQ, the discretization bottleneck maintains a fixed set of nd randomly initialized projection functions. Each projection function projects an encoder output of length D into a slice of dimension D/nd. For each initial encoder output, the discretization bottleneck applies each of the projections to project the initial encoder output into nd slices. The discretization bottleneck maintains a separate subset of discrete latent variables slices for each of the slices and selects, for each slice, the discrete latent variable slice from the corresponding subset that is closest to the slice. The system then generates the discrete latent variable corresponding to the encoder output as a concatenation of the selected latent variable slices. The latent variable slices are updated during training in the same manner as the latent variables in the VQ-VAE bottleneck.

Thus, all of the discretization bottlenecks map each initial encoder output in the initial encoder sequence to a discrete latent variable from a discrete set of latent variables.

While training the models on a given input-output pair, the system 100 also processes the latent variable sequence generated by the autoencoder function 130 using the parallel decoder model 120 to generate a reconstructed target sequence ad(ae(y,x),x). The training engine 140 then trains the models 110, 120, and 130 using ad(ae(y,x),x), lp(x), ae(y,x) and the known target sequence y.

Thus, during training, the functions ae(y, x) and ad(l, x) together form an autoencoder of the targets y that has additional access to the input sequence x.

Training the models 110, 120, and 130 jointly will be discussed in more detail below with reference to FIG. 4.

Figure 2:
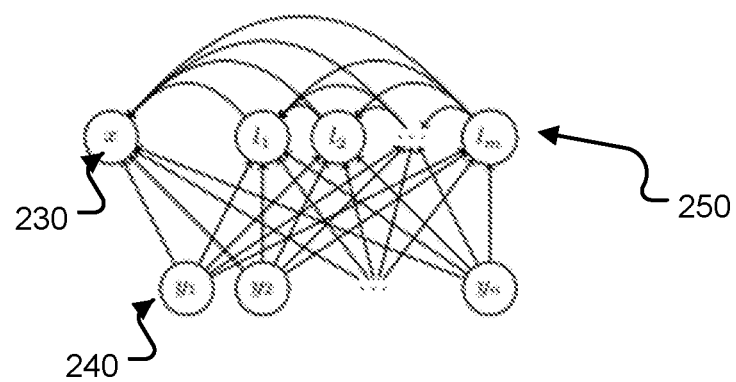
FIG. 2 is a diagram showing the dependence structure of the latent discrete latent variables and the predicted outputs.

FIG. 2 is a diagram 200 showing the dependence structure of the discrete latent variables and the predicted outputs. In particular, in the graph representation of the diagram 200, the input sequence x is represented as a single node 230, the predicted outputs $y_1$ through $y_n$ generated by the parallel decoder model are each represented as respective nodes 240, and the discrete latent variables $l_1$ through $l_m$ generated by the latent prediction model are represented as respective nodes 250. In the diagram 200, an arrow is drawn from node a to another node b if the probability of the node a depends on the node b.

As can be seen in the diagram 200, each of the latent variables $l_1$ through $l_m$ depend on the input sequence x.

Additionally, each latent variable $l_i$ depends on the generated latent variables with index less than i in the sequence, i.e., the latent variables that precede the latent variable in the sequence. Thus, this represents that the latent prediction model generates the sequence of latent variables auto-regressively conditioned on the input sequence.

Additionally, each of the predicted outputs $y_1$ through $y_n$ depends on all of the latent variables $l_1$ through $l_m$ and on the input sequence x. However, none of the predicted outputs depends on any other predicted output. Thus, this represents that the parallel decoder model generates all of the predicted outputs in parallel and independently of one another while conditioned on the latent variables.

Thus, the diagram 200 illustrates the increased parallelism and faster decoding achieved by the described systems relative to conventional auto-regressive models. In particular, conventional auto-regressive models generate the entire output sequence auto-regressively, i.e., with each output in the output sequence being dependent on all of the outputs preceding the output in the output sequence. The described system, on the other hand, only auto-regressively generates a much shorter latent sequence and then generate the entire output sequence in parallel conditioned on the shorter latent sequence. This allows for an order of magnitude decrease in decoding time relative to comparably or even worse performing auto-regressive models.

Figure 3:
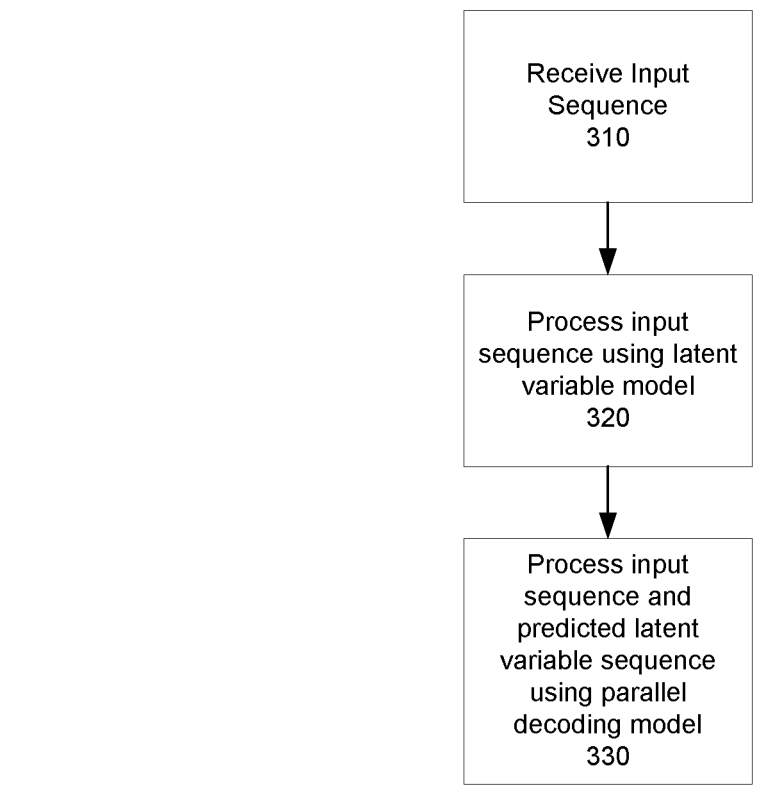
FIG. 3 is a flow diagram of an example process for generating an output sequence from an input sequence.

FIG. 3 is a flow diagram of an example process for generating an output sequence from an input sequence. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system receives an input sequence x that includes inputs $x_1$ through $x_k$ (step 310).

The system processes the input sequence using a latent prediction model to predict a sequence of discrete latent variables that encodes a target sequence for the input sequence but is shorter than the target sequence (step 320). In other words, the predicted sequence of discrete latent variables has m latent variables, while the target sequence has n outputs, with n being greater than m. In particular, the latent prediction model is configured to autoregressively predict the sequence of discrete latent variable conditioned on the input sequence.

The system processes the predicted sequence of discrete latent variables and the input sequence using a parallel decoding model to predict the target sequence for the input sequence (step 306). In particular, the parallel decoding model is configured to generate all of the outputs in the target sequence in parallel and independently of one another conditioned on the sequence of discrete latent variables. That is, the parallel decoding model extends the sequence of m latent variables to a sequence that includes n outputs in a single pass through the parallel decoding model.

In some implementations, the system generates multiple candidate predicted target sequences using the parallel decoding model and then re-scores the candidate predicted target sequences using a higher-powered auto-regressive decoding model. The system can then select the highest scoring candidate predicted translation as the final predicted target sequence. Such a technique is described in more detail in Gu, Jiatao, Bradbury, James, Xiong, Caiming, Li, Victor O. K., and Socher, Richard. Non-autoregressive neural machine translation. CoRR, abs/1711.02281, 2017. URL http://arxiv.org/abs/1711.02281.

Figure 4:
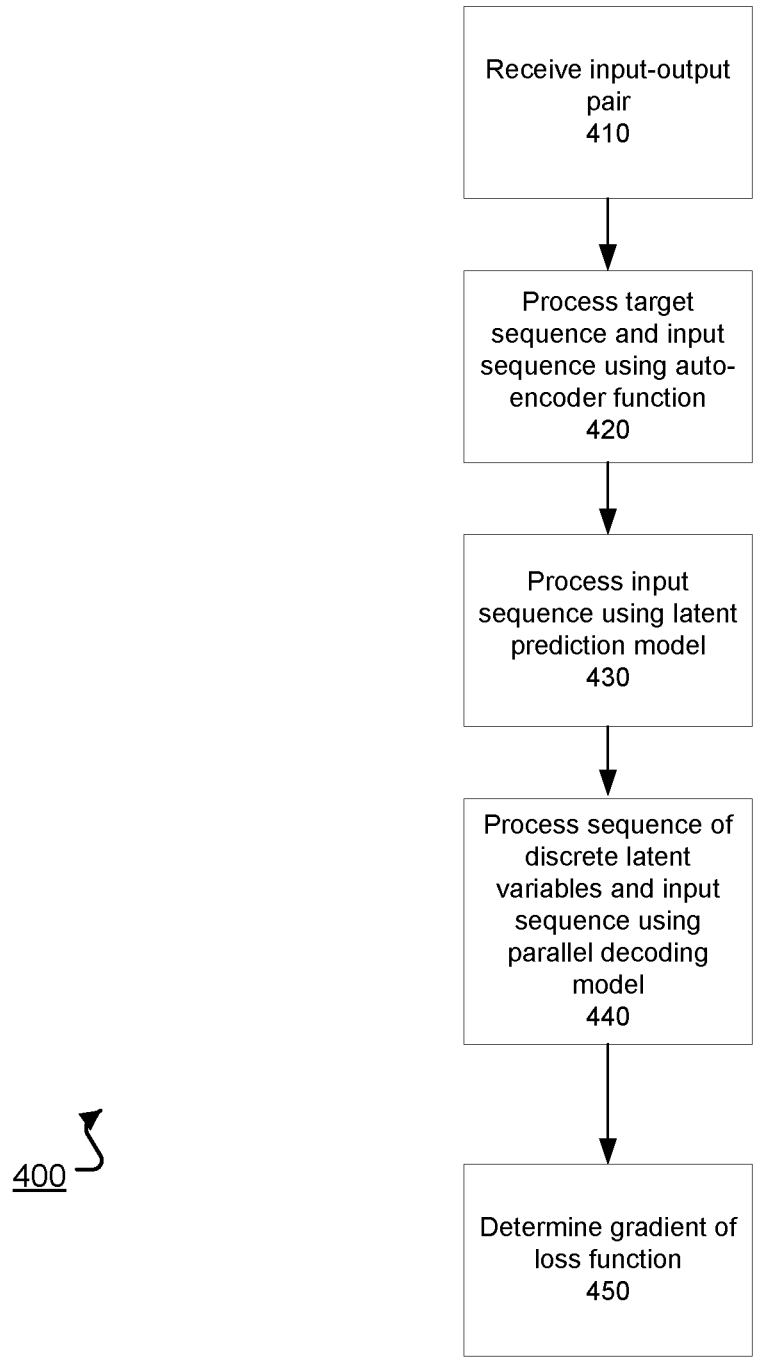
FIG. 4 is a flow diagram of an example process for training the latent prediction model and the parallel decoder model.

FIG. 4 is a flow diagram of an example process for training the latent prediction model and the parallel decoder model. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system receives an input-output pair that includes an input sequence x that includes inputs $x_1$ through $x_k$ and a target sequence y that includes outputs $y_1$ through $y_n$ (step 410).

The system processes the target sequence and the input sequence using the autoencoder function to generate a sequence of discrete latent variables ae(y,x) (step 420).

The system processes the input sequence using a latent prediction model to generate a predicted sequence of discrete latent variables lp(x) that represents a target sequence for the input sequence but is shorter than the target sequence (step 430). In particular, the latent prediction model is configured to autoregressively predict the sequence of discrete latent variable conditioned on the input sequence.

The system processes the sequence of discrete latent variables ae(y,x) and the input sequence x using a parallel decoding model to generate a predicted target sequence ad(ae(y,x)) for the input sequence (step 440). In particular, the parallel decoding model is configured to generate all of the outputs in the target sequence in parallel and independently of one another conditioned on the sequence of discrete latent variables.

As described above, in some implementations the parallel decoding model includes a first subnetwork that decompresses the latent variables to generate a sequence that is the same length as the target sequence and a self-attention decoder that generates the predicted target sequence from the same length sequence. In some of these implementations, the system provides the true target sequence y as input to the self-attention decoder at the initial stages of training, i.e., for a threshold number of initial input-output pairs processed during the training. This ensures that, after this "pre-training" is completed, the self-attention decoder has reasonable gradients that can be backpropagated through the remainder of the parallel decoding model and into the auto encoder function and the discretization bottleneck.

The system determines a gradient with respect to the parameters of the three models of a loss function that depends on (i) an autoencoder reconstruction loss coming from comparing the predicted target sequence ad(ae(y,x)) to the target sequence y and (ii) a latent prediction loss coming from comparing the sequence of discrete latent variables ae(y,x) to the predicted sequence of latent variables lp(x) (step 450). For example, the loss function can be a sum or weighted sum of the autoencoder reconstruction loss and the latent prediction loss. The system can compute the gradient with respect to each of the parameters through backpropagation, i.e., by backpropagating the gradients through each of the three models. The function used to compare the sequences of latent variables can be, e.g., a distance measure while the function used to compare the output sequence can depend on the types of outputs that the system is configured to generate. For example, when the outputs are text sequences, the comparison function can be a perplexity function. The system also computes an update to the latent variables in the set of discrete latent variables using a technique that is appropriate for the discretization bottleneck that is employed.

The system can perform the process 400 for each of multiple input-output pairs in a mini batch of pairs to determine a respective gradient for each of the pairs. The system can then combine, e.g., average or sum, the gradients, determine an update to the current values of the parameters of the three models from the combined gradients in accordance with the update rule of the gradient-based technique that is being used to train the technique, e.g., an rmsProp update rule, an SGD update rule, or an Adam update rule, and add the update to the current values of the parameters to determine updated values of the parameters.

The system can repeatedly update the parameter values and the latent variables as described above to train the models to effectively generate predicted target outputs for received inputs.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating an output sequence comprising a plurality of outputs from an input sequence comprising a plurality of inputs, the method comprising:
   receiving the input sequence;
   processing the input sequence using a latent prediction model configured to autoregressively predict a sequence of discrete latent variables that is shorter than the output sequence, wherein each discrete latent variable in the sequence of discrete latent variables is selected from a discrete set of latent variables, and wherein the latent prediction model is configured to, for each discrete latent variable in the sequence:
   select the discrete latent variable from the discrete set of latent variables conditioned on the input sequence and on any discrete latent variables in the sequence that have already been generated; and
   processing the input sequence and the predicted sequence of discrete latent variables using a parallel decoder model configured to generate the outputs in the output sequence in parallel from the input sequence and the predicted sequence of discrete latent variables, comprising:
   processing, using a first deep neural network within the parallel decoder model, the input sequence and the predicted sequence of discrete latent variables that is generated by the latent prediction model and that is shorter than the output sequence to generate a first sequence that has a same length as the output sequence; and
   processing, using a decoder deep neural network, the first sequence that is generated from the input sequence and the predicted sequence of discrete latent variables to generate the output sequence in parallel from the first sequence in a single forward pass.

2. The method of claim 1, wherein the latent prediction model is an attention-based auto-regressive deep neural network.

3. The method of claim 1, wherein the decoder deep neural network is a self-attention based deep neural network that includes a plurality of self-attention layers.

4. The method of claim 1, wherein the first deep neural network comprises a plurality of steps of neural network layers, wherein each step of neural network layers is configured to receive a step input sequence and to generate a step output sequence that has double the length of the step input sequence.

5. The method of claim 4, wherein each step of neural network layers comprises at least one encoder-decoder attention layer that attends over the input sequence.

6. The method of claim 1, wherein the parallel decoder model and the latent prediction model have been trained jointly with an autoencoder function, wherein the autoencoder function is a deep neural network configured to process the input sequence and a known target sequence for the input sequence to generate a sequence of discrete latent variables that encodes the known target sequence.

7. The method of claim 6, wherein the autoencoder function comprises:
a plurality of neural network layers configured to process the input sequence and the known target sequence to generate an initial encoder output that includes m initial encoder outputs, wherein m is the length of the sequence of discrete latent variables; and
a discretization bottleneck, wherein the discretization bottleneck is configured to, for each of the initial encoder outputs, select a discrete latent variable from the discrete set of latent variables based on the initial encoder output.

8. The method of claim 7, wherein the discretization bottleneck is a sliced vector quantization bottleneck or a projected vector quantization bottleneck.

9. A system comprising one or more computers and one or more storage devices storing instructions that when executed by the one or more computers cause the one or more computers to perform operations for generating an output sequence comprising a plurality of outputs from an input sequence comprising a plurality of inputs, the operations comprising:
receiving the input sequence;
processing the input sequence using a latent prediction model configured to autoregressively predict a sequence of discrete latent variables that is shorter than the output sequence, wherein each discrete latent variable in the sequence of discrete latent variables is selected from a discrete set of latent variables, and wherein the latent prediction model is configured to, for each discrete latent variable in the sequence:
select the discrete latent variable from the discrete set of latent variables conditioned on the input sequence and on any discrete latent variables in the sequence that have already been generated; and
processing the input sequence and the predicted sequence of discrete latent variables using a parallel decoder model configured to generate the outputs in the output sequence in parallel from the input sequence and the predicted sequence of discrete latent variables, comprising:
processing, using a first deep neural network within the parallel decoder model, the input sequence and the predicted sequence of discrete latent variables that is generated by the latent prediction model and that is shorter than the output sequence to generate a first sequence that has a same length as the output sequence; and
processing, using a decoder deep neural network, the first sequence that is generated from the input sequence and the predicted sequence of discrete latent variables to generate the output sequence in parallel from the first sequence in a single forward pass.

10. The system of claim 9, wherein the latent prediction model is an attention-based auto-regressive deep neural network.

11. The system of claim 9, wherein the decoder deep neural network is a self-attention based deep neural network that includes a plurality of self-attention layers.

12. The system of claim 9, wherein the first deep neural network comprises a plurality of steps of neural network layers, wherein each step of neural network layers is configured to receive a step input sequence and to generate a step output sequence that has double the length of the step input sequence.

13. The system of claim 12, wherein each step of neural network layers comprises at least one encoder-decoder attention layer that attends over the input sequence.

14. The system of claim 9, wherein the parallel decoder model and the latent prediction model have been trained jointly with an autoencoder function, wherein the autoencoder function is a deep neural network configured to process the input sequence and a known target sequence for the input sequence to generate a sequence of discrete latent variables that encodes the known target sequence.

15. The system of claim 14, wherein the autoencoder function comprises:
a plurality of neural network layers configured to process the input sequence and the known target sequence to generate an initial encoder output that includes m initial encoder outputs, wherein m is the length of the sequence of discrete latent variables; and
a discretization bottleneck, wherein the discretization bottleneck is configured to, for each of the initial encoder outputs, select a discrete latent variable from the discrete set of latent variables based on the initial encoder output.

16. The system of claim 15, wherein the discretization bottleneck is a sliced vector quantization bottleneck or a projected vector quantization bottleneck.

17. One or more non-transitory computer-readable storage media storing instructions that when executed by one or more computers cause the one or more computers to perform operations for generating an output sequence comprising a plurality of outputs from an input sequence comprising a plurality of inputs, the operations comprising:
receiving the input sequence;
processing the input sequence using a latent prediction model configured to autoregressively predict a sequence of discrete latent variables that is shorter than the output sequence, wherein each discrete latent variable in the sequence of discrete latent variables is selected from a discrete set of latent variables, and wherein the latent prediction model is configured to, for each discrete latent variable in the sequence:
select the discrete latent variable from the discrete set of latent variables conditioned on the input sequence and on any discrete latent variables in the sequence that have already been generated; and
processing the input sequence and the predicted sequence of discrete latent variables using a parallel decoder model configured to generate the outputs in the output sequence in parallel from the input sequence and the predicted sequence of discrete latent variables, comprising:

processing, using a first deep neural network within the parallel decoder model, the input sequence and the predicted sequence of discrete latent variables that is generated by the latent prediction model and that is shorter than the output sequence to generate a first sequence that has a same length as the output sequence; and processing, using a decoder deep neural network, the first sequence that is generated from the input sequence and the predicted sequence of discrete latent variables to generate the output sequence in parallel from the first sequence in a single forward pass.

18. The non-transitory computer-readable storage media of claim 17, wherein the latent prediction model is an attention-based auto-regressive deep neural network.

19. The non-transitory computer-readable storage media of claim 17, wherein the decoder deep neural network is a self-attention based deep neural network that includes a plurality of self-attention layers.

20. The non-transitory computer-readable storage media of claim 17, wherein the first deep neural network comprises a plurality of steps of neural network layers, wherein each step of neural network layers is configured to receive a step input sequence and to generate a step output sequence that has double the length of the step input sequence.

* * * * *